United States Patent
Fischer et al.

(10) Patent No.: US 7,222,046 B2
(45) Date of Patent: May 22, 2007

(54) DEVICE AND METHOD FOR ASCERTAINING THE WHEEL POSITION OF WHEELS ON A WHEELED VEHICLE

(75) Inventors: Martin Fischer, Bad Soden (DE); Manfred Fröhler, Mühlhausen (DE); Franz Hillenmayer, Burglengenfeld (DE); Matthias Münch, Obertraubling (DE); Martin Prenninger, Regensburg (DE); Dieter Wagner, Laaber (DE); Gero Wuttke, Schierling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/109,511

(22) Filed: Apr. 19, 2005

(65) Prior Publication Data

US 2005/0234677 A1 Oct. 20, 2005

(30) Foreign Application Priority Data

Apr. 19, 2004 (DE) ...................... 10 2004 018 827

(51) Int. Cl.
*G06F 15/00* (2006.01)
(52) U.S. Cl. ..................................... 702/150
(58) Field of Classification Search .................. 702/94, 702/95, 150, 188, 189
See application file for complete search history.

(56) References Cited

U.S. PATENT DOCUMENTS

| | | | |
|---|---|---|---|
| 5,880,363 A | 3/1999 | Meyer et al. .............. 73/146.5 |
| 6,034,597 A | 3/2000 | Normann et al. ........... 340/447 |
| 6,112,585 A | 9/2000 | Schrottle et al. .............. 73/146 |
| 6,700,480 B2 | 3/2004 | Moore ........................ 340/445 |
| 7,148,793 B2 * | 12/2006 | Lin ............................. 340/442 |
| 2003/0107481 A1 * | 6/2003 | Sawafuji ..................... 340/442 |
| 2004/0055370 A1 | 3/2004 | Normann et al. ............. 73/146 |
| 2004/0172179 A1 * | 9/2004 | Miwa .......................... 701/29 |
| 2004/0193341 A1 * | 9/2004 | Katou .......................... 701/29 |
| 2005/0258951 A1 * | 11/2005 | Lin ............................. 340/447 |
| 2006/0055524 A1 * | 3/2006 | Okubo ....................... 340/445 |

FOREIGN PATENT DOCUMENTS

| | | |
|---|---|---|
| DE | 196 31 783 A1 | 3/1998 |
| DE | 197 20 123 C2 | 7/1998 |
| DE | 100 14 949 A1 | 10/2001 |
| DE | 103 17 331 A1 | 11/2003 |
| DE | 10 2004 018 827 | * 11/2005 |
| EP | 0 763 437 B1 | 3/1997 |
| WO | WO 98/31901 | 7/1998 |

\* cited by examiner

*Primary Examiner*—Michael Nghiem
(74) *Attorney, Agent, or Firm*—Laurence A. Greenberg; Werner H. Stemer; Ralph E. Locher

(57) ABSTRACT

Devices and methods are used for ascertaining wheel positions of wheels on a wheeled vehicle. Separate wheel units are connected to each other via a vehicle bus and via an additional supply lead, so that for the purposes of learning the separate wheel units, the separate wheel units are connected to the supply lead successively in a predetermined sequence and provided with a new, individual identity code, or subjected to a wheel-unit-specific dc voltage potential as an identity code by using at least one additional connection.

17 Claims, 3 Drawing Sheets

DEVICE AND METHOD FOR ASCERTAINING THE WHEEL POSITION OF WHEELS ON A WHEELED VEHICLE

BACKGROUND OF THE INVENTION

Field of the Invention

The present invention relates to devices and methods for ascertaining the wheel position of wheels on a wheeled vehicle.

Although applicable to any desired wheeled vehicles displaying one or more wheels, the present invention and also the problem on which it is based are explained in detail with reference to a passenger motor vehicle.

The correct setting of the air pressure of motor vehicle wheels is important with regard to various aspects. On the one hand, an excessively high or excessively low air pressure leads to increased tire wear so that the motor vehicle tires have to be replaced prematurely, thereby giving rise to unnecessary costs. On the other hand, an excessively low air pressure in particular brings with it a considerable safety risk since it causes increased rolling activity of the tire walls, leading to an increase in the temperature of the motor vehicle tire. The strength of the tire walls decreases markedly as a consequence, which can lead to the "bursting" of the motor vehicle tire and therefore severe traffic accidents particularly at high speeds.

Accordingly, the tire pressure of motor vehicles has to be checked regularly for safety reasons, although this is something, which is frequently omitted. Modern motor vehicles have tire pressure monitoring devices for this reason amongst other things, which measure the tire pressure automatically, and which identify at least a critical divergence from a target value for the internal tire pressure and display it to the motor vehicle driver. This therefore makes a manual check unnecessary.

For this purpose, each wheel typically has an electronic wheel unit, which picks up the tire pressure of a respectively assigned wheel and sends the information to an evaluation unit of the motor vehicle. An electronic wheel unit can be understood to mean any facility, which ascertains information from which the fault conditions possibly occurring at the wheel can be detected. The term "fault condition" must be interpreted broadly in the present context and embraces all conditions, properties and information for a respective wheel, which are regarded as being worth detecting.

In addition to the actual detection of a fault condition, it is desirable in the case of methods and facilities of this type that the wheel position of the separate wheels is also transferred together with a respective fault condition so that the motor vehicle user can assign the fault condition to a specific wheel position.

An individual code, which is characteristic for the tire is therefore usually also transmitted together with the tire condition data. The code is stored in the electronics unit of each tire for example. The tire condition data received from the vehicle-side wheel units is fed into a vehicle-side central evaluation unit, by which each signal is then analyzed and the measured condition data compared with approved reference values. In the case of divergence from the reference values, a display is activated which displays to the motor vehicle user that he should initiate suitable measures, such as changing or pumping up a tire. For the purposes of certainty, a plurality of measurements can also be taken and a mean or time-dependent value ascertained from them, which is then compared with the reference value, which can similarly change over time.

The present invention is therefore based in general terms on the following problem. In order for the central evaluation unit to identify precisely which tire the condition data is being reported from, the central evaluation unit has to be informed at least once before or during the journey which sensor and therefore which code is assigned to which wheel position. In the case of permanent assignment of the tire electronics units to specific wheel positions, the tire condition data becomes unusable as soon as the tires are swapped around or a tire is replaced by a spare tire. In this respect, a spatial position on the motor vehicle would have to be newly assigned to each tire electronics unit once again manually following each tire change. It is therefore desirable to ascertain the wheel position (such as front left FL, front right FR, rear right RR or rear left RL) of the separate wheels in addition to the actual detection of a fault condition, so that in the case of a fault condition occurring, this can be displayed together with the respective wheel position.

With regard to determining the wheel positions, which is frequently also designated as localization in the relevant literature, a large number of different methods are known, a few of which are briefly explained in the following.

A tire pressure monitoring device is described in German Patent DE 197 20 123 C2 in which a receiving antenna assigned for this purpose is provided in the area of each wheel to be monitored, with which the signals sent out by the electronic wheel unit can be received. Admittedly, the receiving antenna also receives signals from electronic wheel units of neighboring wheels. For the purposes of differentiating the wheel position of the separate wheels, it is assumed here that a signal sent out and received from an immediately neighboring wheel unit displays a higher signal level than a signal that is received by an electronic facility arranged at a greater distance. This known system is also extraordinarily hardware/software-intensive since in particular a dedicated antenna has to be provided for each electronic facility.

In a further known method of the type for determining the wheel position, each electronic wheel unit sends the corresponding information to the central evaluation unit by using high-frequency signals. Analysis of the field strength of the received signals then enables this signal to be assigned to a wheel position.

The problem with this field-strength-dependent determination of the wheel position consists in the fact that the received field strength (RSSI=Received Signal Strength Indicator) is dependent on the most diverse parameters, such as the sensitivity of the receiver, the output power of the electronic facility, the type of wheel rim, the moment of torsion of the wheel, reflections in the sinusoidal high-frequency signal, environmental parameters, etc.

Alongside the parameters, the received field strength is very strongly dependent on the respective wheel angle of the sending antenna during the transmission. The reason for this is that the sending antenna is an integral part of the wheel and therefore rotates together with the corresponding wheel, with the result that the data signals sent are dependent on rotational effects. The wheel angle especially leads to considerable fluctuations in the field strength.

Moreover, the left/right localization issue has been solved by using acceleration sensors in the past, European patent EP 1 003 647 B1 (corresponding to U.S. Pat. No. 6,556,502 B1) discloses a device in which the sign of the acceleration measured in the wheel specifies the vehicle side.

A disadvantage of the method relates to the need for a separate acceleration sensor.

A further approach uses analysis of the field strength of the radio telegram, which is received by the vehicle. European patent EP 0 763 437 B1 discloses a system in which the field strength of a radio telegram is analyzed by using four antennas respectively mounted in the vicinity of a wheel. The installation site of the antenna with the highest measured field strength then identifies the wheel of origin of the telegram.

A disadvantage of the method relates to the fact that a major effort is needed for the antenna installation.

Furthermore, so-called trigger antennas can be used. U.S. Pat. No. 5,880,363 describes a system in which precisely one wheel electronics unit is activated for the purposes of transmitting a data telegram with a special identification signal by using a long-wave signal. The identification codes of the assigned wheel electronics units are captured by cyclical activation of all the wheel positions.

A disadvantage of this method lies in the need for additional long-wave antennas on the vehicle side and additional long-wave receiver units on the wheel side.

According to a further approach in the state of the art, wheel units of tire air-pressure monitoring systems of the first generation inform the motor vehicle of their identity by way of so-called identification numbers or identification codes. The radio signals, which are sent out by the tire electronics units contain, for example, tire information referring to pressure, temperature and identification code.

A disadvantage with this approach, however, has turned out to be the fact that a central evaluation unit of a vehicle can capture the identification codes of neighboring vehicles due to the high range of the radio signals, thereby leading to incorrect tire information. To prevent incorrect information of this kind, the motor vehicle therefore has to be familiarized with the wheel electronics units mounted on the vehicle tire first in an initialization stage, to be able to establish unambiguously later whether a received radio signal has been sent from one of the vehicle's own wheel electronics units or a wheel electronics unit of a neighboring motor vehicle. By way of disadvantage, the identification codes therefore have to be stored in the central evaluation unit of the motor vehicle first, where the send signals captured following the initialization are checked for their authenticity by comparing the identification codes with the identification codes stored in the initialization phase. If they match, then the captured pressure and temperature values, for example, are those for the tires located on the motor vehicle. Additional external signals can also be captured in the familiarization or initialization phase, however, so that an initialization with incorrect identification codes or no initialization at all is carried out.

SUMMARY OF THE INVENTION

It is accordingly an object of the invention to provide a device and a method for ascertaining the wheel position of wheels on a wheeled vehicle which overcomes the above-mentioned disadvantages of the prior art devices and methods of this general type, which ascertains wheel position of wheels on a motor vehicle and which is simpler, more reliable and more cost-effective.

The idea underlying the invention relates to the fact that the motor-vehicle-side wheel units are connected to each other via a motor vehicle bus and via an additional supply lead. A central evaluation unit connects the separate wheel units successively to an additional supply lead for an energy supply in a defined sequence and newly assigns a predetermined or individual identity code to the respectively connected wheel unit. The separate wheel units of the motor vehicle are therefore successively newly learned and provided respectively with an individual identity code, for example in an initialization operation of the motor vehicle. It can therefore be simply ensured that the currently received wheel condition variables can be assigned to a precisely defined wheel position.

According to a further aspect of the invention, the separate wheel units of the motor vehicle are connected to each other via a motor vehicle bus and an additional supply lead, where each wheel unit displays one additional connection at least for applying a wheel-unit-specific dc voltage potential to the one connection at least as an identity code.

It is therefore similarly simply ensured that each wheel unit autonomously identifies, for example in each initialization of the motor vehicle, which position the assigned wheel on the motor vehicle is attached at, and can inform the central evaluation unit of this correspondingly.

The invention therefore has the advantage with respect to the approaches according to the state of the art that only minor modifications to existing components are needed for the realization of the method according to the invention and the device according to the invention. Simple and cost-effective ascertainment of the wheel position of wheels is therefore produced, so that even in the event of a change of wheel and/or tire, the wheel condition variables supplied by a wheel unit can be reliably assigned by the central evaluation unit to a specific wheel position.

According to a preferred development, the separate wheel units are disposed connected one after the other in the supply lead system. The series connection enables the central evaluation unit to connect one wheel unit after the other to the supply lead system and supply it with energy. An addressable switch is preferably assigned respectively to each wheel unit in the predetermined sequence for connection of the further wheel unit to the supply lead system. By way of advantage, each switch can be addressed by the preceding wheel unit and/or the central evaluation unit. It is therefore ensured that the predetermined sequence is simply observed and the respectively newly connected wheel units are provided with the new predetermined identity code by the central evaluation unit.

According to a further preferred embodiment, the separate wheel units can be connected to the supply lead system in parallel. By way of advantage, the separate wheel units can respectively be connected and disconnected by the central evaluation unit, for example, to and from the supply lead systems via a switch. In this respect, separate wheel units or groups of wheel units can be connected or disconnected to or from the supply lead system depending on the application requirement.

According to a further preferred development, in the event that each wheel unit has one additional connection at least for applying a wheel-unit-specific dc voltage potential as an identity code, the one additional connection at least can be connected to a lead of the motor vehicle bus, a lead of the supply battery, a ground lead or no lead at all as an identity code. A number of additional connections is preferably matched to the number of wheel units to be assigned an identity code. If four wheel units are provided on the motor vehicle, for example, then one additional connection each at each wheel unit is sufficient. Applying the additional connection to one of the four aforesaid leads and/or no lead at all enables four differing dc voltage potentials to be applied to the four wheel units. The additional connection therefore serves as coding for which wheel position the respective wheel unit is located at.

According to a further preferred embodiment, the supply lead system has a battery, in particular a 12 V, 24 V or 42 V battery, for the local energy supply, which can be connected to the central evaluation unit or is integrated in same. However, any desired other battery, such as a 3 V, 5 V, etc. battery, can also be used as the local energy supply. The tire monitoring data preferably includes tire pressure, tire temperature, a noise profile, vibration behavior or similar for the respective wheel.

In particular, the motor-vehicle-side wheel units are respectively attached in the area of an assigned wheel box of the wheeled vehicle, so that the monitoring data picked up by the wheel-side tire electronics units can be simply transmitted to the motor-vehicle-side wheel units, for example by using a transponder system.

The motor vehicle bus is preferably realized as a LIN bus, K-LINE bus, MOST bus or CAN bus. Other bus systems are of course also conceivable.

According to a further embodiment, the central evaluation unit can be connected to an optical and/or acoustic display facility, which displays to the motor vehicle user which wheel position the received monitoring data must be assigned to. The motor vehicle user is therefore well informed about which of the wheels should possibly be replaced or repaired in the case of any fault condition.

In order to provide an energy-saving system, only the wheel unit that is currently to carry out a measurement and/or the forwarding of tire condition data is preferably connected to the supply lead system. A large time interval between the separate connections to the supply lead system is sufficient initially for example, where the time interval can be increased by the central evaluation unit as a function of the monitoring data captured. This is advantageous in the case of divergences of the measured data from stored reference values, for example, in order to be able to react appropriately in the shortest possible time where relevant.

Other features which are considered as characteristic for the invention are set forth in the appended claims.

Although the invention is illustrated and described herein as embodied in a device and a method for ascertaining the wheel position of wheels on a wheeled vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
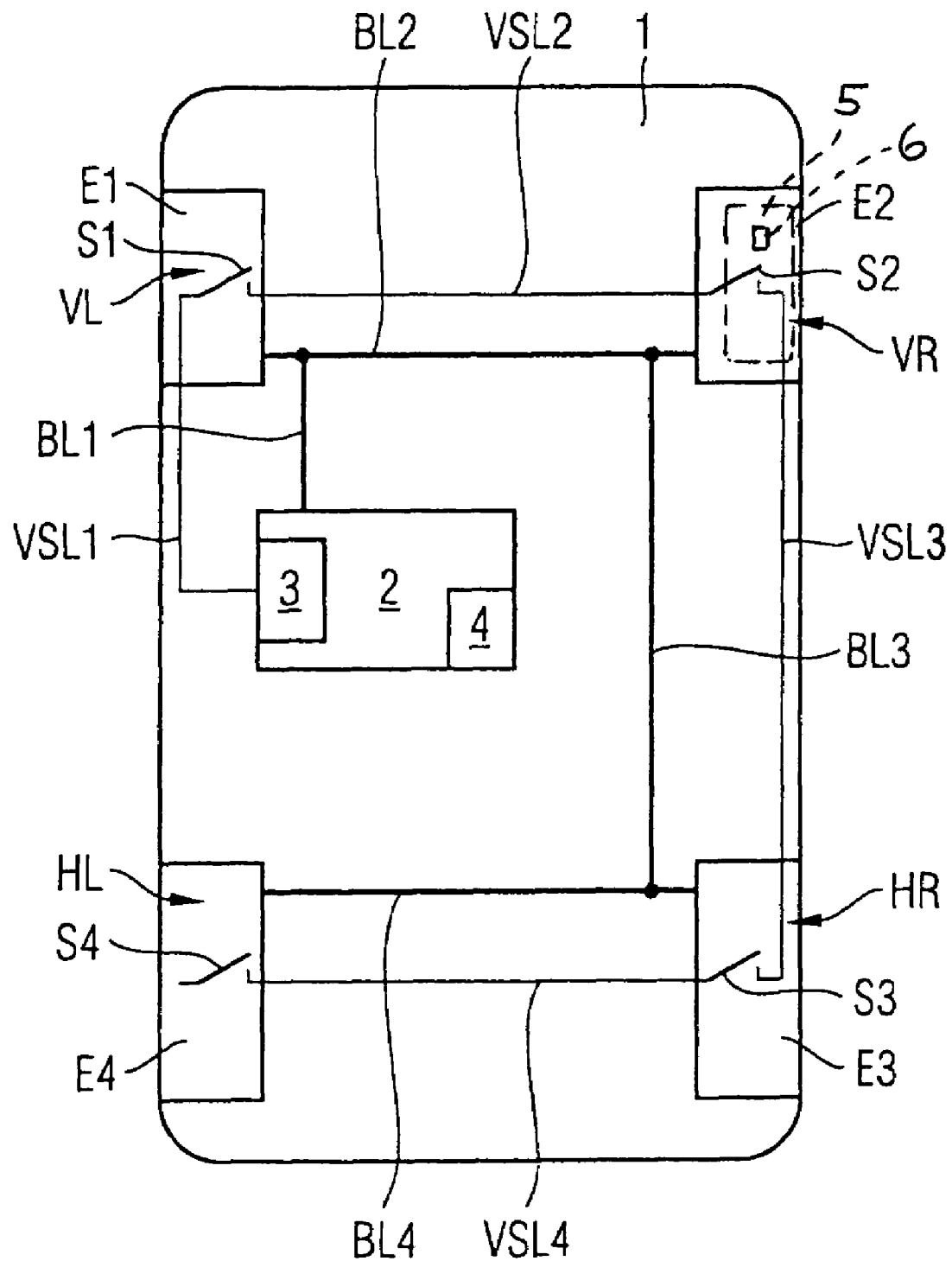
FIG. 1 is a schematic illustration of a first exemplary embodiment of device for ascertaining a wheel position of wheels on a motor vehicle according to the invention.

In all the figures of the drawing, sub-features and integral parts that correspond to one another bear the same reference symbol in each case. Referring now to the figures of the drawing in detail and first, particularly, to FIG. 1 thereof, there is shown a schematic illustration of a device for ascertaining a wheel position of wheels on a motor vehicle 1 according to a first exemplary embodiment of the present invention. A method for ascertaining the wheel position of wheels on the motor vehicle 1 according to an exemplary embodiment of the present invention is explained in detail with reference to FIG. 1.

As is illustrated in FIG. 1, the motor vehicle 1 has four wheel units for example, specifically a first wheel unit E1, a second wheel unit E2, a third wheel unit E3 and a fourth wheel unit E4. The separate wheel units E1, E2, E3, E4 are preferably attached respectively on the motor vehicle side in an area of a non-illustrated assigned wheel box of the motor vehicle 1. The wheel units E1, E2, E3, E4 are coupled to an assigned electronics unit 6 of a wheel 5 provided in the respective wheel box via a suitable data link. The wheel condition variables, which are picked up by the corresponding wheel-side electronics unit 6 are therefore transmitted to the assigned wheel unit E1, E2, E3 or E4 by the wheel-side electronics unit 6.

The wheel units E1, E2, E3, E4 are connected for signaling purposes in series to each other and to a central evaluation unit 2 via a bus system, such as a LIN bus or a CAN bus, as is shown in FIG. 1.

Reference should be made at this point to the fact that according to the present exemplary embodiment, elements and components which are assigned to the wheel position front left FL are provided with a symbol suffix "1", elements and components which are assigned to the wheel position front right FR are provided with a symbol suffix "2", elements and components which are assigned to the wheel position rear right RR are provided with a symbol suffix "3" and elements and components which are assigned to the wheel position rear left RL are provided with a symbol suffix "4". The wheel unit E1 therefore designates the wheel unit disposed at front left for example, the wheel unit E2 the wheel unit disposed at front right, etc.

It can be seen from FIG. 1 moreover that according to the present exemplary embodiment, the wheel unit E1 is connected to the central evaluation unit 2 via the bus lead BL1. The wheel unit E1 is in turn connected to the wheel unit E2 via the bus lead BL2. The wheel unit E2 is connected to the wheel unit E3 via the bus lead BL3, and finally the wheel unit E3 is in turn connected to the wheel unit E4 via a bus lead BL4, with the result that the separate wheel units E1, E2, E3, E4 are connected for signaling purposes in series to each other via the bus leads BL1, BL2, BL3, BL4.

As can be seen moreover in FIG. 1, the system preferably displays an additional supply lead system, where the wheel unit E1 is connected to an energy supply source 3 via a supply lead VSL1. The energy supply source 3 can be realized as an automobile battery with a 12 V voltage, for example, which forms an integral part of the central evaluation unit 2 or can be connected to the central evaluation unit 2.

Moreover, a switch S1 is preferably assigned to the wheel unit E1 at front left FL, which connects the energy supply source 3 electrically to the wheel unit E1 in the closed condition. The separate switches S1, S2, S3, S4 are preferably addressable by using the central evaluation unit 2 or the respectively preceding wheel unit.

The wheel unit E1 can be electrically connected to the electronic wheel unit E2 via a supply lead VSL2 and an assigned switch S2. The wheel unit E2 in turn can be connected to the wheel unit E3 via an electrical supply lead VSL3 via a switch S3. The wheel unit E3 finally can be electrically connected to the wheel unit E4 via the supply lead VSL4 by using a switch S4.

The wheel units E1, E2, E3, E4 can therefore be electrically connected in series to each other via the respectively assigned switches S1, S2, S3, S4, where the central evaluation unit 2 can connect or disconnect the separate wheel units E1, E2, E3, E4 in a predetermined sequence, specifically in the serial sequence of their connections to each other, to the energy supply source 3 by closing the separate switches S1, S2, S3, S4.

The central evaluation unit 2 can therefore newly learn the separate wheel units via the motor vehicle bus and the supply lead system, in the case of each new startup or each initialization of the motor vehicle for example, in such a way that a precisely defined wheel position FL, FR, RR, RL is assigned to each wheel unit E1, E2, E3, E4. This is explained in detail in the following.

For example, the central evaluation unit 2 only connects the electronic wheel unit E1 at the wheel position FL to the energy supply source 3 via the supply lead VSL1 by closing the switch S1 in the case of a new startup of the motor vehicle 1, where the switch S1 is automatically closed following the ignition event of the motor vehicle for example. This makes a power supply available to the wheel unit E1 at the wheel position FL.

The central evaluation unit 2 transfers the general identity code 0000, for example, to the connected wheel unit E1, following which the wheel unit E1 sends a reply signal back to the central evaluation unit 2 via the motor vehicle bus. Following this, the central evaluation unit 2 issues a new, individual identity code to the wheel unit E1, such as the identity code FL, which designates the wheel position front left.

The identity code signals or the addressing and reply signals are preferably sent via the bus leads BL1, BL2, BL3 and BL4 of the motor vehicle bus system.

Then the switch S2 is closed for connection of the wheel unit E2 to the supply lead system via the supply lead VSL2. Such addressing of the switch S2 can similarly be effected by the central evaluation unit 2 or by the already addressed wheel unit E1, for example, as already explained above. This connects the newly connected wheel unit E2 to the energy supply source 3. The central evaluation unit 2 addresses the newly connected wheel unit E2 in turn with the general identity code 0000 for example. The newly connected wheel unit E2 sends a reply signal back via the motor vehicle bus, following which the central evaluation unit 2 assigns a new, individual identity code, such as FR, to the newly connected wheel unit E2 via the motor vehicle bus which characterizes the wheel position front right.

Following this, the switch S3 is closed by the central evaluation unit 2 or the already connected wheel unit E2 for example, so that the wheel unit E3 is connected to the energy supply source 3 via the supply lead VSL3. The central evaluation unit 2 can therefore in turn address the newly connected wheel unit E3 via the motor vehicle bus with the general identity code 0000 and following a reply signal from the newly connected wheel unit E3, assign a new, individual identity code, such as RR, via the motor vehicle bus. In this respect, the identity code RR designates the wheel position rear right.

Finally, the switch S4 is closed by the central evaluation unit 2 or the already connected wheel unit E3 for example, so that the wheel unit E4 is connected to the energy supply source 3 for an energy supply for same. The wheel unit E4 receives in turn, for example, a trigger signal from the central evaluation unit 2 with the general identity code 0000, following which the newly connected wheel unit E4 sends a reply signal to the central evaluation unit 2 via the motor vehicle bus.

Following this, the central evaluation unit 2 assigns via the motor vehicle bus system a new, individual identity code, such as RL, to the newly connected wheel unit E4 via the motor vehicle bus, which labels the wheel position as rear left.

More than four wheel units can be provided on the motor vehicle, of course, where according to the principle explained above, the separate wheel units are connected one after the other in series and connected to the supply lead system successively in a predetermined sequence and provided with a new, individual identity code in such a way that an unambiguous assignment of the separate wheel units to a specific wheel position is effected.

The new "learning" of the separate wheel units therefore produces a simple device and a simple method with which use can be made of existing components without major modifications and the ascertainment of the wheel position of wheels on the motor vehicle 1 is simply ensured.

An almost simultaneous connection of the separate wheel units to the energy supply system is preferably effected in the case of each new startup of the motor vehicle, i.e. they are located in the same protocol frame and can be fully connected and provided with a new identity code in a time interval in the millisecond range for example.

The separate new, individual identity codes can be stored in an additional memory facility 4 for example, which is an integral part of the central evaluation unit 2 or can be connected to same.

Figure 2:
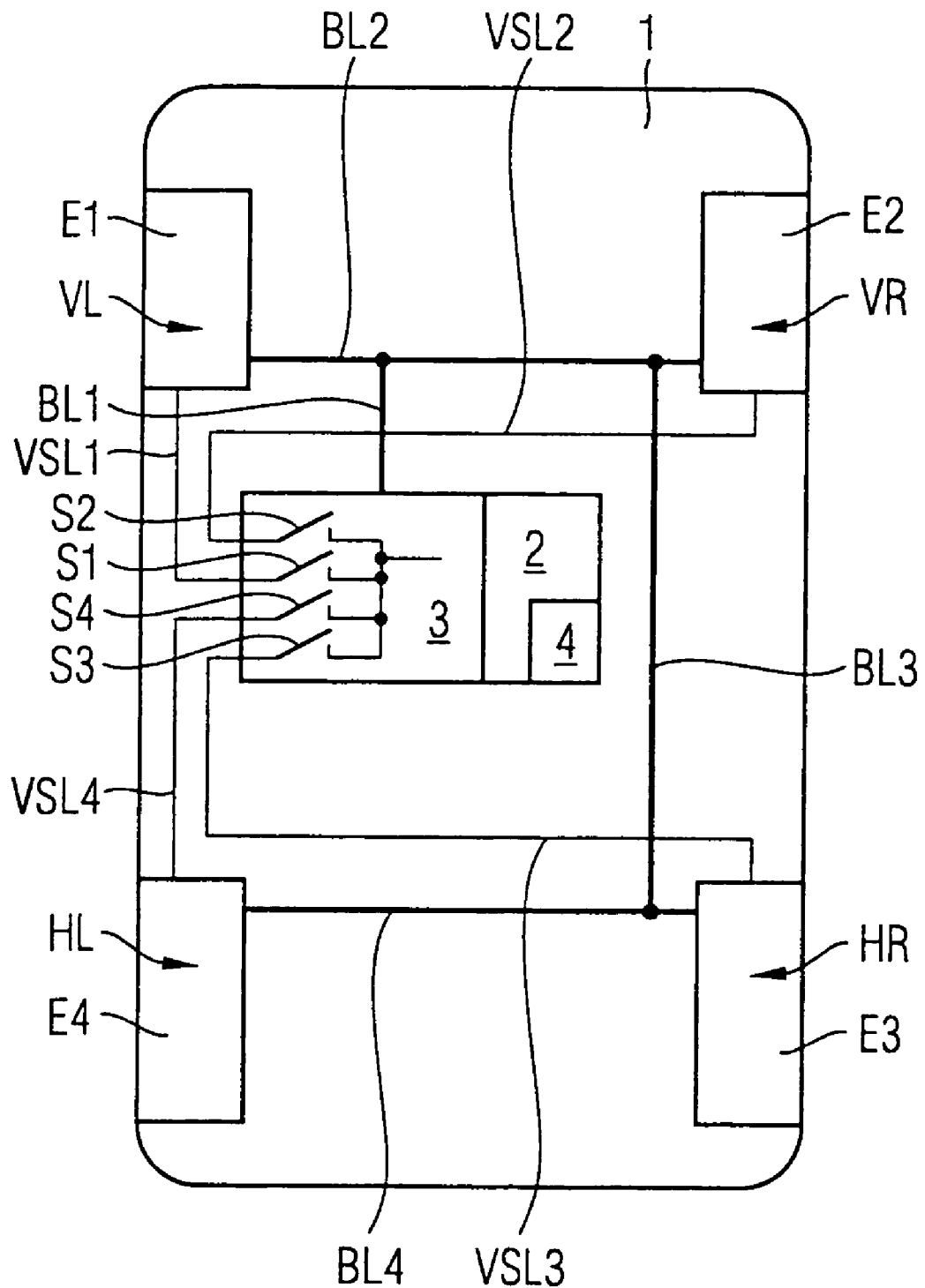
FIG. 2 is a schematic illustration of a second exemplary embodiment of the device according to the invention according.

FIG. 2 illustrates a schematic view of the device for ascertaining the wheel position FL, FR, RR, RL of wheels on a motor vehicle 1 according to a second exemplary embodiment of the invention, where a method for ascertaining the wheel position FL, FR, RR, RL of wheels on a motor vehicle 1 according to a further exemplary embodiment of the present invention is explained in detail by reference to FIG. 2.

As can be seen in FIG. 2, the four wheel units E1, E2, E3, E4 are again provided according to the present exemplary embodiment, which are assigned respectively to the wheel positions front left FL, front right FR, rear right RR and rear left RL. Like in the first exemplary embodiment, the separate wheel units E1, E2, E3, E4 are connected for signaling purposes to each other via the bus leads BL1, BL2, BL3 and BL4 together with a central control and evaluation unit 2.

Additionally, the separate wheel units E1, E2, E3, E4 can be connected respectively via a supply lead VSL1, VSL2, VSL3, VSL4, and via respectively assigned switches S1, S2, S3, S4, to the energy supply source 3, such as a 12 V battery 3 or a supply lead system.

According to the present exemplary embodiment, localization of the separate wheel units E1, E2, E3, E4 is effected by the fact that the separate supply leads VSL1, VSL2, VSL3, VSL4 can be connected and disconnected separately for each wheel unit or in groups centrally in the control unit or the evaluation unit 3. This is particularly advantageous from the energy point of view since use is only made of the energy supply source 3 if a requirement for the assignment of a new identity code or the forwarding of measured monitoring data by the corresponding wheel unit is currently desired.

A possible example of a learning procedure is reproduced by way of example in the following.

For example, only the first wheel unit E1 at the wheel position FL is fed with energy by closing the switch Si by using the central control unit 2. Like in the first exemplary embodiment, this can preferably be affected in the case of each new startup or each initialization of the motor vehicle 1. The central evaluation unit 2 addresses the wheel unit E1 with the general identity code, such as 0000, following which, like in the first exemplary embodiment, the connected wheel unit E1 sends a reply signal back to the central evaluation unit 2 via the motor vehicle bus system. Following this, the central evaluation unit 2 assigns a new, individual identity code, such as FL, to the connected wheel unit E1 via the motor vehicle bus system or the bus lead BL1. This makes it possible for the central evaluation unit 2 to identify unambiguously that the monitoring data received from the wheel unit E1 must be assigned to the tire which is located at the wheel position FL, i.e. front left.

The separate new, individual identity codes can again be stored in the memory facility 4 for example, which is an integral part of the central evaluation unit 2 or can be connected to same.

Following the opening of the switch S1 and the disconnection of the wheel unit E1, a further wheel unit, such as the wheel unit E2, can be connected via the supply lead VSL2 to the supply lead system by closing the switch S2. Then, in like manner, a new identity code, such as FR, for designation of the wheel position front right, is assigned to the wheel unit E2.

This procedure is performed with all the wheel units provided on the motor vehicle system, where the wheel units can be connected and disconnected separately or in groups to the central supply lead system by closing the correspondingly assigned switches. A separate connection and disconnection is advantageous for energy reasons, since the energy of the battery 3 serving as a supply source, for example, is limited.

By way of advantage, the separate wheel units E1, E2, E3, E4 are connected to the battery 3 separately and successively and in a predetermined sequence, in order to send the received monitoring data of the respectively assigned wheels to the central evaluation unit 2 via the bus system. In this respect, the time interval between the separate connections or interrogations can be set by the central analysis unit 2 as a function of the monitoring data already captured and analyzed. If an increased divergence of the measured data, for example, is detected from reference values stored in the memory facility 4 in advance, for example, then the time interval between the separate interrogations can be shortened, so that a relevant malfunction of a tire is displayed to the motor vehicle user without a major time delay.

Only the wheel unit, which is currently to carry out the measurement or send the measured monitoring data to the central evaluation unit 2 is addressed for example. Once assigned to the wheel units, the individual identity codes are preferably stored and maintained in the memory facility 4, as already explained above.

Figure 3:
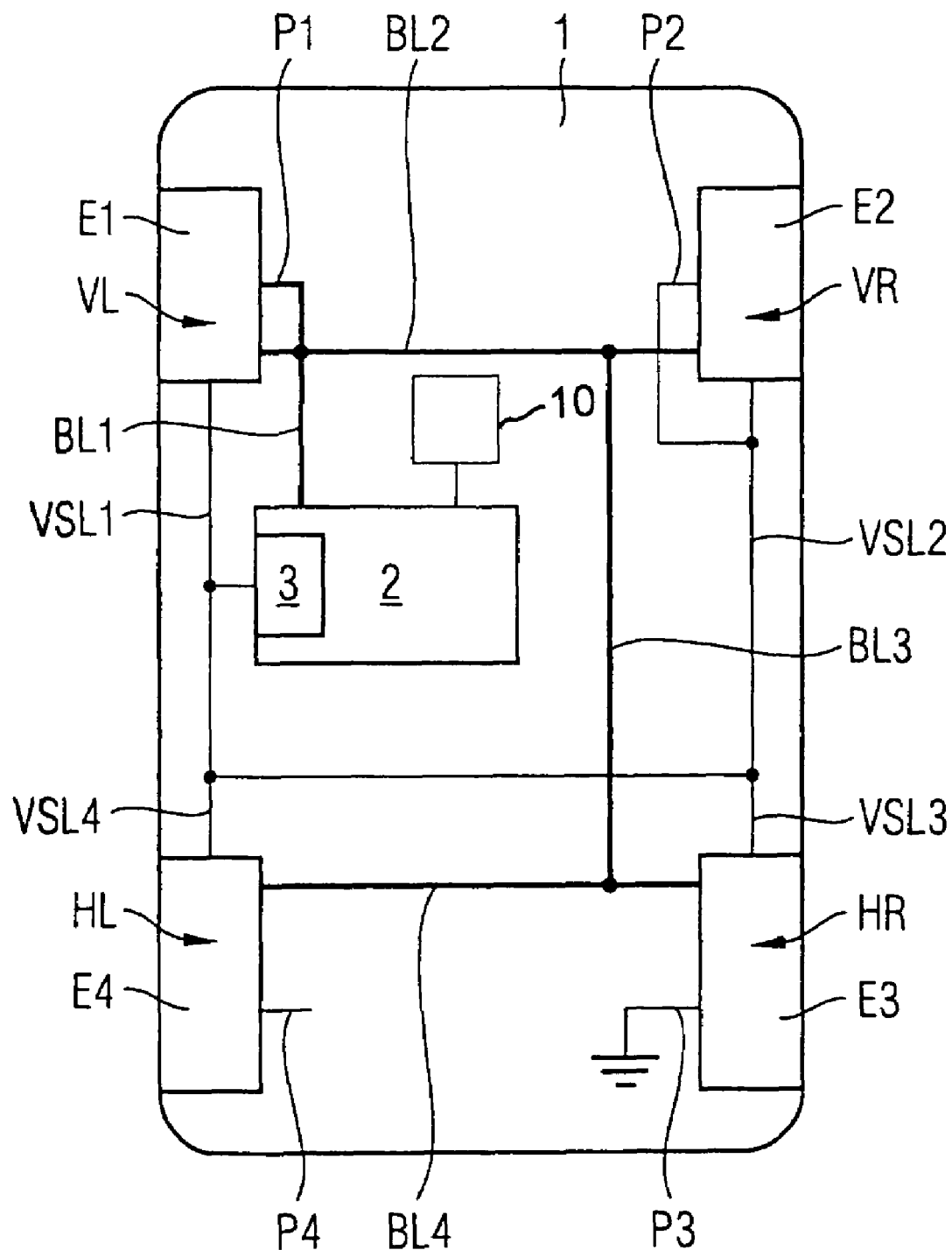
FIG. 3 is a schematic illustration of a third exemplary embodiment of the device according to the invention.

FIG. 3 illustrates a schematic view of a device for ascertaining the wheel position of wheels according to a third exemplary embodiment of the present invention. As can be seen in FIG. 3, the four wheel units E1, E2, E3, E4 are again provided on the motor vehicle for example, which are again connected to each other via a motor vehicle bus, such as a LIN bus or a CAN bus.

In contrast to the first and second exemplary embodiments, one additional connection or pin P1, P2, P3, P4 in a plug connection of the separate wheel units E1, E2, E3, E4 is provided as coding for the separate wheel units E1, E2, E3, E4 according to this exemplary embodiment.

The additional connection P1 of the wheel unit E1 is connected to the lead for the motor vehicle bus system for example, as shown in FIG. 3. The additional connection P2 of the wheel unit E2 is electrically connected to the supply lead system for example, the additional connection P3 of the wheel unit E3 is connected to a ground lead for example, and the additional connection P4 of the wheel unit E4 is left vacant for example. Therefore a wheel-unit-specific dc voltage potential is applied to each additional connection P1, P2, P3, P4 as an identity code. A layout according to the above exemplary embodiment results in the voltage of the motor vehicle bus lead, in the mV range for example, being applied at the additional connection P1, the voltage of the energy supply source 3, 12 V for example, being applied at the additional connection P2, a ground potential of 0 V being applied at the additional connection P3, and no potential being applied at the additional connection P4, where this differs due to fluctuations in the ground potential. In the case of installation of the corresponding wheel units E1, E2, E3, E4 and corresponding connection of the additional connection to the assigned dc voltage potential, therefore, each wheel unit can autonomously identify which wheel position FL, FR, RR, RL it is attached at on the motor vehicle and correspondingly inform the central control unit 2 of this via the assigned motor vehicle bus system for example.

The quantity of additional connections per wheel unit is preferably matched to the quantity of wheel units to be assigned an identity code. In the case of more than four wheel units, two additional connections or pins can be provided per wheel unit for example, with the result that further individual identity codes or individual dc voltage potentials can be assigned to a specific wheel unit by any desired combinations of the various potentials described above.

It is therefore ensured simply and without major modifications that the central control unit 2 identifies at each point in time which wheel position the currently activated wheel unit is positioned at.

In this case, the separate wheel units can be connected to the supply lead system in parallel or in series and be suitably connected or disconnected according to the first or second exemplary embodiment.

Although the present invention was described in the foregoing on the basis of preferred exemplary embodiments, it is not limited to them but can be modified in numerous ways.

The central control and analysis unit 2 is connected to an optical and/or acoustic display unit 10 for example, which displays to the motor vehicle user which wheel position the received monitoring data of a wheel unit must be assigned to. It is therefore simple for the motor vehicle user to identify which tire should be replaced or repaired where relevant.

The connection mode and the assignment mode for an individual identity code is preferably automatically connected in the case of the motor vehicle being put into operation, so that the assignment of the separate wheel units to specific wheel positions is effected in the operation of the motor vehicle. Such a method can be newly carried out in the case of each startup of the motor vehicle for example, where the separate individual identity codes are stored in a memory facility. Should the motor vehicle not remain stationary for longer than a predetermined period, then use can preferably be made of the stored identity codes and a new assignment and/or a new learning process can be avoided, with the result that the energy consumption of the energy supply source is reduced.

This application claims the priority, under 35 U.S.C. § 119, of German patent application No. 10 2004 018 827.0, filed Apr. 19, 2004; the entire disclosure of the prior application is herewith incorporated by reference.

We claim:

1. A device for ascertaining a wheel position of wheels on a wheeled vehicle, the device comprising:
   separate wheeled-vehicle-side wheel units each respectively assigned to one of the wheels for monitoring purposes and respectively receiving monitoring data of an assigned wheel;
   a vehicle bus connected to said separate wheel units;
   a central control and analysis unit connected through said vehicle bus to each of said separate wheel units for an exchange of data; and
   a supply lead system connected to and supplying said separate wheel units with energy;
   said central control and analysis unit connecting said separate wheel units successively to said supply lead system for an energy supply in a defined sequence and assigning a new individual identity code to a respectively connected wheel unit.

2. The device according to claim 1, wherein said separate wheel units are connected to each other in series within said supply lead system.

3. The device according to claim 1, further comprising addressable switches, a respective one of said addressable switches is assigned to each of said separate wheel units for connecting or disconnecting said respective wheel unit to or from said supply lead system.

4. The device according to claim 3, wherein said respective addressable switch can be addressed by a preceding one of said separate wheel units and/or said central control and analysis unit.

5. The device according to claim 3, wherein said separate wheel units can be connected to the supply lead system in parallel.

6. The device according to claim 5, wherein:
   said supply lead system has an energy supply source; and
   said separate wheel units can be respectively connected and disconnected by said central control and analysis unit directly to said energy supply source of said supply lead system through said addressable switches.

7. The device according to claim 6, wherein said supply lead system uses a 12 V battery as said energy supply source, said battery being one of connected to said central control and analysis unit and integrated in said central control and analysis unit.

8. The device according to claim 1, wherein the monitoring data is selected from the group consisting of tire pressure, tire temperature, a noise profile of the tire, and a vibration behavior of the tire.

9. The device according to claim 1, wherein said separate wheel units are respectively attached in an area of an assigned wheel box of the wheeled vehicle.

10. The device according to claim 1, wherein said vehicle bus is a LIN bus or CAN bus.

11. The device according to claim 1, further comprising an optical and/or acoustic display unit connected to said central control and analysis unit and displaying to a motor vehicle user which wheel position the monitoring data has come from.

12. A method for ascertaining a wheel position of wheels on a wheeled vehicle, separate wheel units each being respectively assigned for monitoring purposes to each of the wheels and respectively connected to a central control and analysis unit for an exchange of data, which comprises the steps of:
   each time the wheeled vehicle is put into operation:
      connecting the separate wheel units in a defined sequence to a supply lead system for supplying energy to the separate wheel units by the central control and analysis unit; and
      assigning a new, individual identity code to the respectively connected wheel unit by the central control and analysis unit and; and
   identifying each of the separate wheel units with the individual identity code assigned thereto during a current operation of the vehicle, ascertaining the wheel position of the wheels on the wheeled vehicle in accordance with the identity codes assigned to the wheel units, and outputting a signal with the wheel position of at least one wheel on the wheeled vehicle.

13. The method according to claim 12, which further comprises storing new assigned identity codes in a memory unit.

14. The method according to claim 12, which further comprises connecting the central control and analysis unit to an optical and/or acoustic display facility, which displays to a motor vehicle user which wheel position monitoring data was received from.

15. A method for ascertaining a wheel position of wheels on a wheeled vehicle, separate wheel units each being respectively assigned for monitoring purposes to each of the wheels and respectively connected to a central control and analysis unit for an exchange of data, which comprises the steps of:
   connecting the separate wheel units in a defined sequence to a supply lead system for supplying energy to the separate wheel units by the central control and analysis unit; and
   assigning a new, individual identity code to the respectively connected wheel unit by the central control and analysis unit; and
   connecting and disconnecting each of the separate wheel units to the supply lead system separately or in groups; and
   identifying the separate wheel units with the individual identity codes assigned thereto, ascertaining the wheel position of the wheels on the wheeled vehicle in accordance with the identity codes assigned to the wheel units, and outputting a signal with the wheel position of at least one wheel on the wheeled vehicle.

16. The method according to claim 15, which further comprises connecting only the separate wheel unit which is to carry out a measurement or a transmission of tire monitoring data to the supply lead system.

17. A method for ascertaining a wheel position of wheels on a wheeled vehicle, separate wheel units each being respectively assigned for monitoring purposes to each of the wheels and respectively connected to a central control and analysis unit for an exchange of data, which comprises the steps of:

connecting the separate wheel units in a defined sequence to a supply lead system for supplying energy to the separate wheel units by the central control and analysis unit; and assigning a new, individual identity code to the respectively connected wheel unit by the central control and analysis unit; and controlling a time interval between or an order of connection operations by the central control and analysis unit in dependence on captured monitoring data; and identifying the separate wheel units with the individual identity codes assigned thereto, ascertaining the wheel position of the wheels on the wheeled vehicle in accordance with the identity codes assigned to the wheel units, and outputting a signal with the wheel position of at least one wheel on the wheeled vehicle.

* * * * *